United States Patent [19]

Weisstuch et al.

[11] 3,918,300

[45] Nov. 11, 1975

[54] HEAT TRANSFER MEASURING DEVICE

[76] Inventors: Aaron Weisstuch, 326 Margery Road, Yardley, Pa. 19067; Charles E. Schell, III, Chalet Village Apartments, Heights Lane, Feasterville, Pa. 19047

[22] Filed: Jan. 3, 1974

[21] Appl. No.: 430,453

[52] U.S. Cl. .................................. 73/112; 73/15 R
[51] Int. Cl.² ........................................ G01M 19/00
[58] Field of Search ......... 73/15 R, 15 A, 15.4, 112; 165/11

[56] References Cited
UNITED STATES PATENTS

| | | | |
|---|---|---|---|
| 1,605,779 | 11/1926 | Rissmann | 73/112 |
| 2,040,086 | 5/1936 | Goodwillie | 73/112 |
| 2,305,769 | 12/1942 | Germer | 73/112 |
| 3,095,739 | 7/1963 | Doolittle | 73/190 |
| 3,229,499 | 11/1966 | Shayeson et al. | 73/15 |

OTHER PUBLICATIONS

Kreith, "Principles of Heat Transfer" Published by International Textbook Co., pp. 445–448, pub. 1961.

*Primary Examiner*—Herbert Goldstein

[57] ABSTRACT

A device is provided for measuring the efficiency of a heat exchanger. The device comprises a plurality of temperature sensors, a plurality of difference means and calculation means. The difference means are each responsive to a different pair of the temperature sensors to provide a signal representative of the temperature difference between the location of the sensors. The calculation means is responsive to the signals from the difference means for generating a signal representative of the efficiency of the heat exchanger. The signal is representative of either the heat transfer coefficient or the fouling factor in a heat exchanger.

11 Claims, 13 Drawing Figures

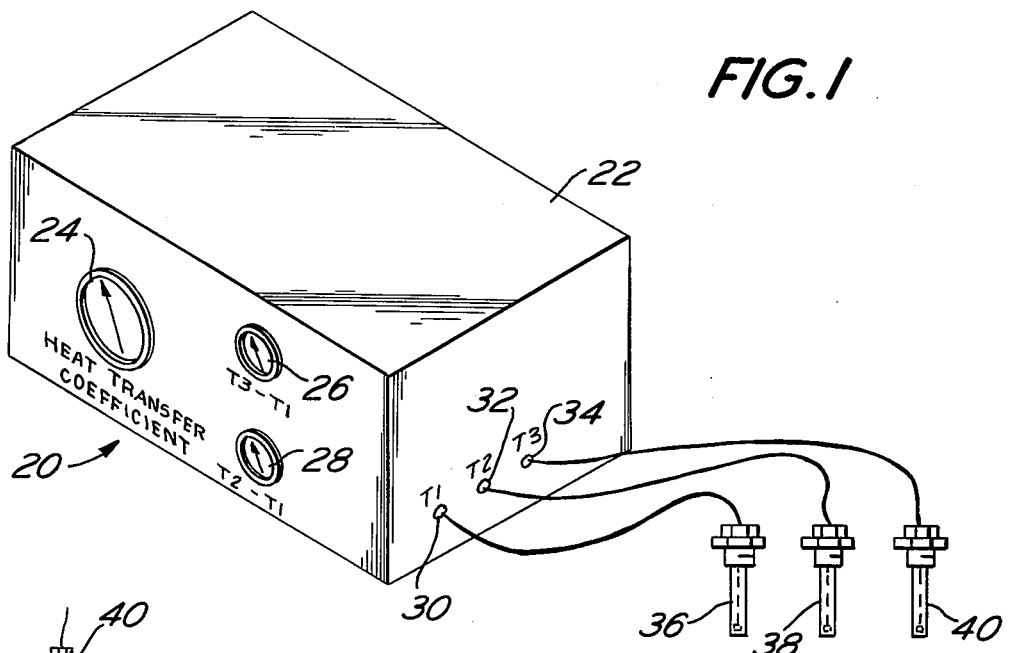
FIG. 1
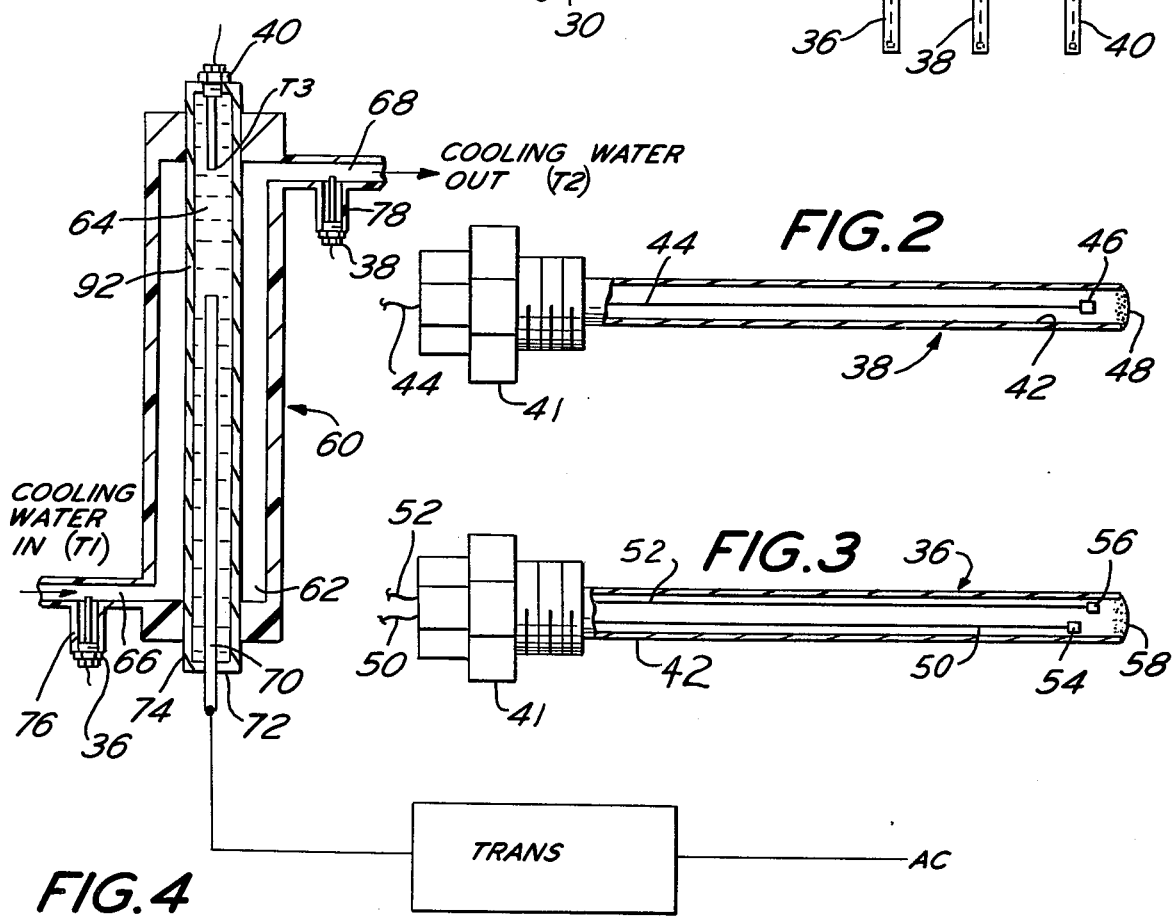
FIG. 2
FIG. 3
FIG. 4

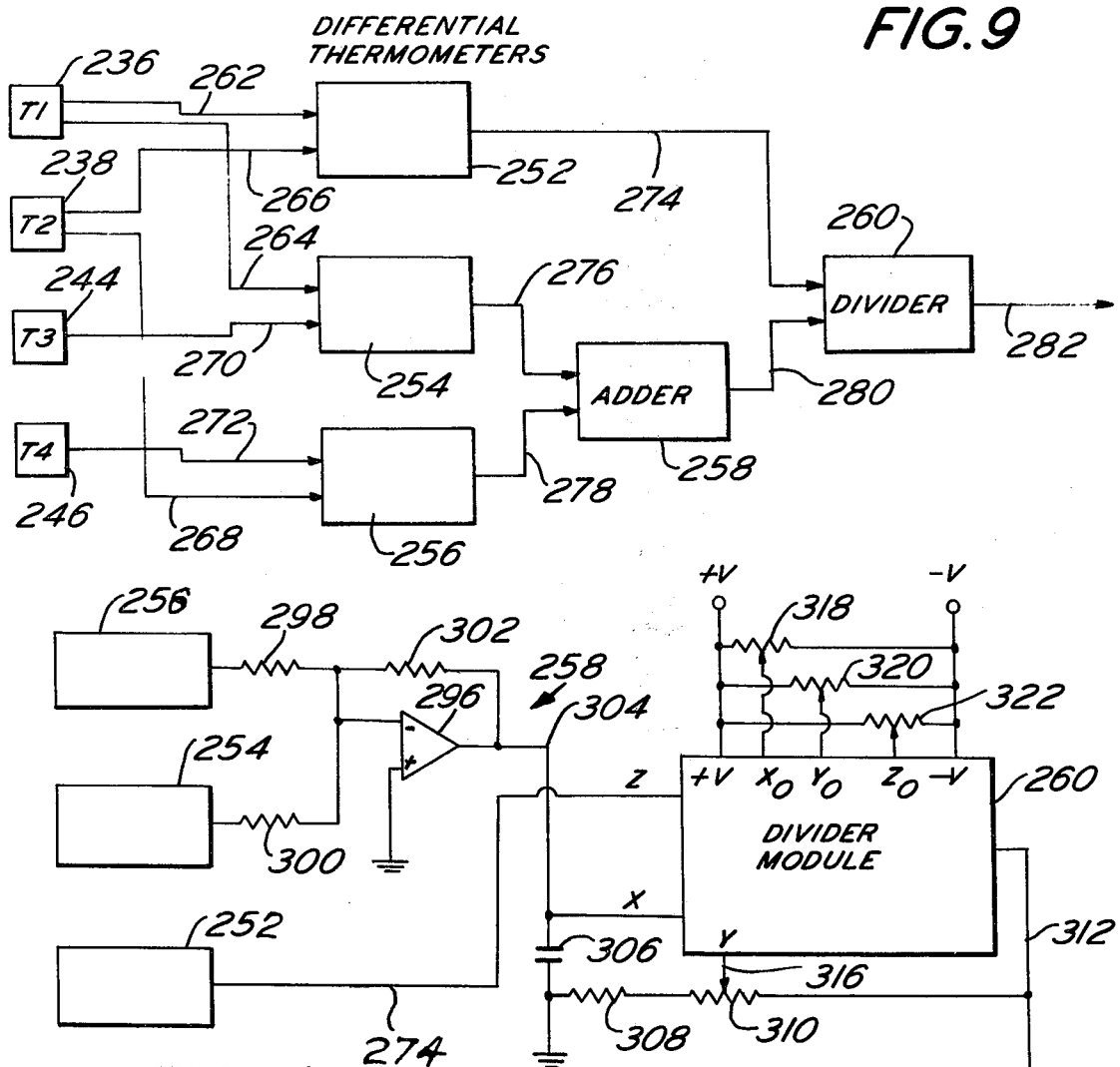
FIG. 9
FIG. 10
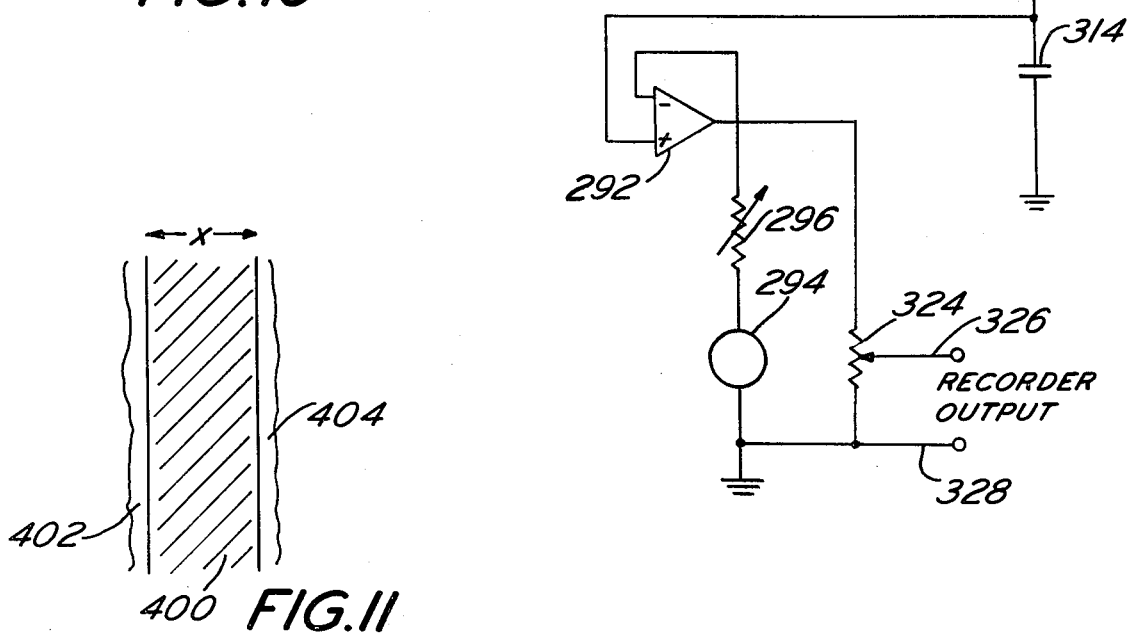
FIG. 11

HEAT TRANSFER MEASURING DEVICE

This invention relates generally to measuring and testing devices and more particularly to a heat transfer measuring device for use in heat exchangers.

The effectiveness of a heat exchanger is, of course, dependent on its heat transfer coefficient. Heat exchangers are used in industrial processes of all types for the effective removal of excess, unwanted or undesirable heat. The heat exchanger normally removes the heat by passing a cold fluid through a compartment which is adjacent a compartment containing the fluid having the unwanted heat. The compartments are normally separated by a wall of a material usually comprising a metal which conducts heat from one side to the other. The heat transfer coefficient is a measure of the ability of the wall to conduct heat from one side to the other.

It can therefore be seen that a critical parameter affecting the efficiency of the heat exchange between the fluids in the separate compartments is the heat transfer coefficient. The condition of the metal surface, since it affects the heat transfer coefficient, thus has an important effect in determining the efficiency of heat transfer.

An example of a heat exchanger used in industrial processes is one used in a petroleum refinery. The hot fluids which are to be cooled are likely to be hydrocarbons, and if fouling is not a problem, the hot side of the heat transfer material will probably retain good heat transfer characteristics. However, the cold side of the heat exchanger is likely to be contacted with aerated, corrosive and deposit forming cooling water. Corrosion, fouling, and deposition of dissolved scale-forming substances such as calcium carbonate and calcium sulfate can significantly reduce the heat transfer effectiveness of the cooling water side of the wall of the exchanger.

Calcium carbonate and calcium sulfate are common deposit forming materials because they have negative solubility/temperature coefficients. Accordingly, these materials have increased tendencies for deposition at the heat transfer surface in view of the fact that there is a stagnant layer of water immediately adjacent the heat transfer surface which will be of a higher temperature than the remaining bulk of the water not immediately adjacent to this surface. Accordingly, since the solubility decreases for these materials as the temperature increases, the common deposit forming materials are precipitated and deposited on the surface of the metal.

Therefore, it is extremely desirable to have a method by which heat transfer efficiency, as reflected by the heat transfer coefficient, can be continuously measured. That is, if such a measurement can be performed on a continuous basis, remedial measures involving chemical treatment of the water to reduce corrosion, fouling and scaling can be used before a serious reduction in the heat transfer coefficient occurs.

There are various chemical treatments including corrosion inhibitors, biocides, slimicides, scale inhibitors and dispersants which can control all of these undesirable circumstances and limit their magnitude. However, the prior art is devoid of a convenient reliable measuring device for heat transfer efficiency which continuously provides a measurement of heat transfer efficiency. That is, previous attempts at measuring the heat transfer efficiency include the measurement of scale forming tendency which is an indirect measure and thus would measure a quantity which is believed to be related to scale forming tendencies.

It is therefore an object of this invention to overcome the disadvantages of previous attempts at measurement of scale forming tendency.

Another object of the invention is to provide a new and improved device for measuring heat transfer efficiency which measures directly the heat transfer coefficient.

Another object of the invention is to provide a new and improved heat transfer measuring device which provides the engineer with a monitoring device for operating an industrial process effectively and efficiently.

Still another object of the invention is to provide a new and improved heat transfer measuring device which utilizes differential thermometers which incorporate silicon transistors as temperature sensors.

Still another object of the invention is to provide a new and improved heat transfer measuring device which provides direct readout in the terms of heat transfer coefficient or the fouling factor.

These and other objects of the invention are achieved by providing a device for measuring the efficiency of the heat exchanger which comprises a plurality of temperature sensors, a plurality of difference means and calculation means. The difference means are each responsive to a different pair of the sensors for providing signals representative of the temperature difference between the locations of the sensors. The calculation means are responsive to the signals from the difference means for generating signals representative of the efficiency of the heat exchange.

Other objects and many of the attendant advantages of this invention will be readily appreciated as the same becomes better understood by reference to the following detailed description when considered in connection with the accompanying drawings wherein:

FIG. 1 is a perspective view of a heat transfer measuring device embodying the invention;

FIG. 2 is a side elevational view with portions shown in vertical section for purposes of clarity of a probe utilized in the heat transfer measuring device having a single temperature sensor;

FIG. 3 is a side elevational view with portions shown in vertical section for purposes of clarity of a probe utilized by the device having a pair of temperature sensors;

FIG. 4 is a schematic view of a heat exchanger in which the heat transfer measuring device is utilized for measuring the efficiency of the system;

FIG. 9 is a schematic block diagram of the electronic circuitry utilized for calculating the heat transfer efficiency of the heat exchanger in FIG. 8;

FIG. 10 is a schematic diagram of the electronic circuitry utilized in the alternate heat transfer measuring device embodying the invention;

FIG. 11 is a fragmentary sectional schematic of a heat transfer tube;

Referring now in greater detail to the various figures of the drawings wherein like reference numerals refer to like parts, a heat transfer measuring device is shown generally at 20 in FIG. 1.

Figure 5:
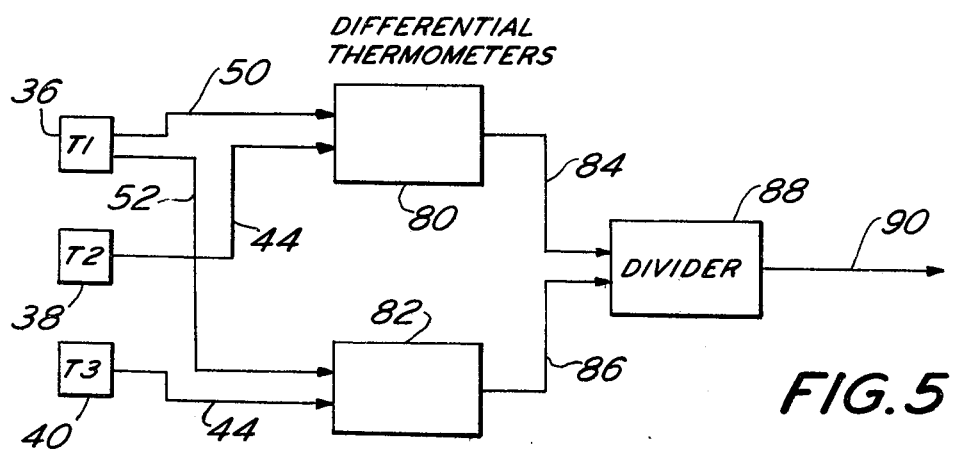
FIG. 5 is a schematic block diagram of the electronic portion of the heat transfer measuring device.

The heat transfer measuring device basically comprises a rectangular housing 22 having a plurality of gauges 24, 26 and 28. The gauges 24, 26 and 28 are provided in the front panel of the measuring device. The gauge 24 is used to indicate the heat transfer coefficient. Gauge 26 provides an indication of the temperature differential at two different points in a heat exchanger and gauge 28 provides the temperature differential between two different points in the heat exchanger. Provided in a side of the housing 22 is a plurality of jacks 30, 32 and 34 by which a plurality of probes 36, 38 and 40 are connected to the electronic circuitry provided within the housing of the heat transfer measuring device 20.

The probes are of two types. The first type of probe is shown in FIG. 2. Probe 38 is shown in FIG. 2 and it is of the type having one temperature sensor therein. The probe basically comprises a Swage fitting 41 which is integrally connected to a metal tube 42. A three conductor cable 44 is provided which extends through the Swage fitting 41 and to a temperature sensor 46. The temperature sensor 46, as will hereinafter be seen in greater detail, is preferably comprised of a silicon transistor. The cable 44 comprises three wires which are connected to the base, emitter and collector of the transistor. At the end of the metal tube 42 there is provided an encapsulating wall 48 which is comprised of epoxy which closes the tube 42 thereat. The transistor 46 at the end of the tube 42 is suitably secured adjacent the wall 48.

Probe 40 is similar to probe 38 in that both the probes 38 and 40 have a single transistor sensor provided therein.

The probe 36 is of similar design to the single probe 38 or 40 in that it includes a Swage fitting 41 and a metal tube 42. However, a pair of cables 50 and 52 are provided which are connected to silicon transistors 54 and 56, respectively. Each of the cables 50 and 52 is a three conductor cable with the three wires of each of the cables being connected to the collector, emitter and base of each of the transistor sensors. An epoxy encapsulant 58 is provided at the end of the metal tube 38 to enclose the metal tube. The transistor sensors are suitably secured adjacent the epoxy encapsulant so that the transistor sensors are maintained at the end of the probe.

A heat exchanger 60 is shown in FIG. 4. Heat exchanger 60 includes a first compartment or chamber 62 and a second compartment or chamber 64. The first chamber 62 has an inlet port 66 and an outlet port 68 and encircles chamber 64. The chamber 64 is sealed at both its ends. At one end, an immersion heater 70 is provided through a sealed opening at end wall 72. At the other end a wall is provided in which probe 40 is mounted. The probe 40 is secured in chamber 64 by the threaded portion of the swage fitting which is threadedly secured in a threaded opening in the end wall. Chamber 64 is preferably provided in a metal tube 74 which is of a cylindrical configuration. The cylindrical tube wall provides the physical separation between the chamber 62 and chamber 64.

At the inlet port 66 of chamber 62 a flange 76 is provided. The flange 76 has secured therein probe 36 with the end of the probe 36 being in the stream of the cooling water which enters the port 66. Similarly, at the outlet port 68 a flange 78 is provided in which probe 38 is secured. The end of probe 38 is disposed directly in the stream of the cooling water which comes out of the outlet port 68. As indicated in the legend on the diagram of FIG. 4, the temperature of the inlet cooling water is T1, the temperature of the outlet cooling water is T2 and the fluid in chamber 64 is at temperature T3. The temperatures of the transistor sensors in probes 36, 38 and 40 are at temperatures T1, T2, and T3, respectively.

The heat exchanger shown in FIG. 4 is most aptly characterized as a laboratory-type heat exchanger in that the heat exchanger includes a chamber 64 which does not have a fluid flowing through the chamber, but rather, has a heater 70 which provides calories to the fluid in chamber 64 which are removed by the water flowing through chamber 62. The immersion heater is connected to an AC power source via a variable auto transformer (TRANS). The heater 70 converts the electrical energy into calories for providing the necessary heat to the fluid in chamber 64.

In order to best understand how the heat transfer measuring device functions to measure the heat transfer coefficient in the system of FIG. 4, the following heat balance equations should be understood:

The heat balance equation for the system shown in FIG. 4 is as follows:

EQUATION I $$Q_{exch.} = mC(T2 - T1) = UA\Delta T$$

where:
- $Q_{exch.}$ = the heat which is exchanged in BTU/hr
- $m$ = water mass flow rate in lbs/hr
- $c$ = heat capacity of water in BTU/lb–°F
- T1, T2, and T3 are the temperatures at the positions specified by the legends T1, T2 and T3 in FIG. 4
- $U$ = heat transfer coefficient in BTU/hr-ft²–°F
- $A$ = area of heat exchange tube in ft²
- $\Delta T$ = average temperature difference between the fluid in chamber 64 and the fluid in chamber 62

$\Delta T$ is also defined as:

EQUATION II $$\Delta T = \frac{(T3 - T1) + (T3 - T2)}{2}$$

It has been found experimentally that:

EQUATION III $$(T3 - T1) \cong (T3 - T2)$$

By substitution, as defined in equation III, equation II can be written as follows:

EQUATION IV $$\Delta T = (T3 - T1)$$

By substituting equation IV into equation I and then solving for U it is found that:

EQUATION V $$U = \frac{mC}{A} \frac{(T2 - T1)}{T3 - T2}$$

When m, C and A are constant, the equation for the heat transfer coefficient can be written as:

EQUATION VI $$U = \frac{K(T2 - T1)}{(T3 - T1)}$$

It can therefore be seen that the heat transfer coefficient for the system shown in FIG. 4 can be calculated by determining the temperatures at T1, T2 and T3, obtaining the temperature differences between T2 and T1 and T3 and T1 and then dividing the first difference by the second difference and then multiplying the result by a predetermined constant. Thus, a precision differential thermometer can be utilized to obtain the heat transfer coefficient. This is seen in the following description of the electronic circuitry.

A block diagram of the electronic circuitry utilized in the heat transfer measuring device is shown in FIG. 5.

The probes 36, 38 and 40 are connected as shown in FIG. 5 to a pair of differential thermometers 80 and 82. Differential thermometer 80 is connected to the output cable 50 of cable 36 and the output cable 44 of probe 38. Differential thermometer 82 is connected to the cable 52 of probe 36 and to the cable 44 of probe 40. It should be remembered that probe 36 is of the type shown in FIG. 3 having a pair of three conductor cables 50 and 52 which are each connected to a different transistor sensor. The probes 38 and 40 each have a single three conductor cable 44.

The differential thermometer 80 is responsive to the temperature sensors or transistors 54 and 46 of probes 36 and 38 respectively. Similarly, the differential thermometer 82 is responsive to the transistors 56 of probe 36 and transistor 46 of probe 40.

The signals on the cables from the probes enable the differential thermometers 80 and 82 to provide output signals on their respective output lines 84 and 86. These output signals on lines 84 and 86 represent differential temperatures T2 − T1 and T3 − T1, respectively. That is, differential thermometer 80 provides on the output line 84 thereof a difference signal which can be defined as K1 (T2 − T1), where K1 is a first constant and T2 − T1 is the difference between the temperatures at T2 and T1. The output signal on line 86 is defined as K2 (T3 − T1) where K2 is a second constant and T3 − T1 is the difference between the temperatures at T3 and T1. The output lines 84 and 86 are connected to the inputs of the diivider 88 which divides the signal on line 84 by the signal on line 86 to provide the output signal on line 90 which represents K(T2 − T1)/(T3 − T1). As seen above, this value is equal or proportioned to U, which is the heat transfer coefficient.

Gauge 24 which is shown in FIG. 1 is connected to the output signal from the divider to provide a visual readout of the heat transfer coefficient. The readout of the instrument is thus the actual value of the heat transfer coefficient U at the instant of measurement. This readout which is presented on the panel meter 24 located at the front panel of the instrument shown in FIG. 1 enables a constant visual inspection or monitoring of the heat transfer coefficient to determine whether any fouling has taken place on the heat transfer surface, namely, wall 92 of the tube 74.

It should also be understood that an alarm circuit can be connected to the output signal of divider 88 which is activated if the heat transfer coefficient falls below a predetermined value. A threshold gate or quantizer can be used which is connected to output signal 90 which initiates the supply of a corrosion inhibitor, antiscalant, antifoulant or other chemical treatments into the heat exchanger system so that the heat transfer can be improved. The alarm circuitry can also be used to either switch the process fluid to another heat exchanger or to shut down the process if dangerous conditions result.

Figure 6:
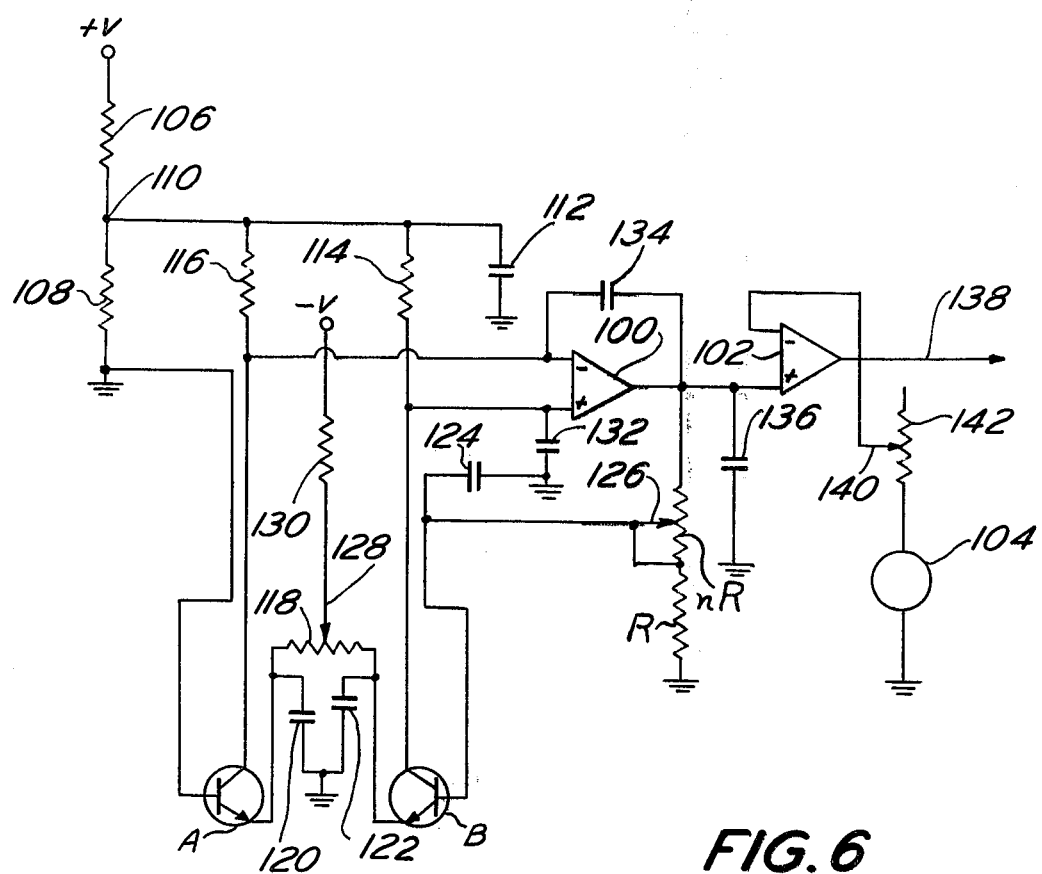
FIG. 6 is a schematic diagram of the differential theremometers used in the electronic circuitry of FIG. 5.

Each of the differential thermometers are constructed as shown in FIG. 6. A pair of transistors A and B are provided in the circuit in FIG. 6 to show the operation of the circuit. The transistors A and B each represent a temperature sensor transistor which is disposed in one of the probes and is connected to the remaining portions of the circuitry via the cables comprised of the three wires connected to the base collector and emitter of the transistors A and B.

The remaining portion of the circuit in FIG. 6 includes a pair of operational amplifiers 100 and 102, associated resistors, capacitors and a volt meter or gauge 104. The gauge 104 in differential thermometer 82 is gauge 26 and in thermometer 80 is Gauge 28 in FIG. 1. A pair of resistors 106 and 108 are connected serially between +V and ground and form a voltage divider. The junction 110 between resistors 106 and 108 is connected via capacitor 112 to ground, via resistor 114 to the collector of transistor B and via resistor 116 to the collector of transistor A. The collector of transistor A is also connected to the inverting input (−) of operational amplifier 100. The base of transistor A is connected to ground, the emitter of transistor A is connected to one end of a variable resistor 118 and to ground via capacitor 120.

The collector of transistor B is also connected to the noninverting (+) input of the operational amplifier 100. The emitter of transistor B is connected to the other end of resistor 118 and via capacitor 122 to ground. The base of transistor B is connected to ground via capacitor 124 and to the wiper arm 126 of a variable resistor nR and to the junction between resistor nR and R. −V is connected to the wiper arm 128 of variable resistor 118 via resistor 130. The noninverting input of the operational amplifier 100 is also grounded via a capacitor 132. The output of the operational amplifier 100 is connected via capacitor 134 to its inverting input, to the noninverting input of operational amplifier 102 and to one end of resistor nR.

Operational amplifier 100 is thus connected as a differential amplifier to provide an output signal in accordance with the difference in temperature at the transistors A and B. The noninverting input of operational amplifier 102, in addition to be connected to the output of operational amplifier 100, is connected via capacitor 136 to ground. The input of the operational amplifier 102 is connected to the inverting input thereof, the output line 138 and to wiper arm 140 of variable resistor 142. The resistor 142 acts as a meter calibrator for the milivolt meter 104 which is connected to resistor 142 on one side and ground on the other side.

In operation, resistors 106 and 108 act as a voltage divider. The voltage at junction 110 is thus fed via resistors 114 and 116 to the collectors of transistors A and B. The positive voltage is also fed via the resistor 118 to the emitters of transistors A and B. The wiper arm 128 of resistor 118 enables a zero adjust to compensate for any differences between transistors A and B. That is, the wiper arm 128 can be adjusted so that the differential amplifier will not have an output signal when the temperature at both transistors A and B are equal. The voltage supplied to the collectors of the transistors A and B causes current to flow through the transistors and therefore develop a potential between the base and the collectors of each of the transistors A and B. The potential between the base and the collector of each of the transistors is temperature dependent and varies linearly with the temperature over a reasonable range of temperatures. The variable resistor 118 has the wiper arm 128 preset so that the differential amplifier provides no voltage output when the transistors A and B are at the same temperature.

The inverting input of operation amplifier 100 is connected to the collector output of the transistor A and is thereby responsive to the voltage across the transistor A. The output signal from operational amplifier 100 is fed back to the base of transistor B via resistor nR. As a result of the feedback, the potential at the noninverting (+) input of operational amplifier 100 is the same as that of the voltage across the collector-base junction of transistor A.

The feedback current flowing through resistors nR and R develops a votage at the input to the operational amplifier 102, which is equal to the output voltage. The voltage which is provided across resistors nR and R is fed to the noninverting input of theoperational amplifier 102 which powers the analog meter 104. The operational amplifier 102 thus acts as a unity gain follower.

The analog meter 104 is calibrated by the adjustment of the variable resistor 142 to read directly in terms of the difference in temperature between the temperatures at transistors A and B. The visual indication of the temperature differences is provided on gauges 26 or 28.

The output line 138 is also connected to either an adder module or a divider module depending on its use. The capacitors 120, 122, 124 and 136 are employed primarily to eliminate spiking and stray effects caused by both AC signals and radio frequency signals.

Normally transistor A is placed in the solution having the higher temperature than the solution in which transistor B is placed so that the output of the device is positive. There are, however, some divider modules which require a negative signal input. In this case, the signal polarity is reversed by use of an additional inverting unity gain amplifier or simply by reversing the placement of transistor B and transistor A. In the instant invention, since the divider modules do require a negative signal input the transistor B is placed in the higher temperature solution when necessary.

The amplification factor n+1, where n equals the resistance of resistor nR divided by the resistance of resistor R, multiplied by the temperature coefficient 1.2 mV/°F, determines the individual factors K1 and K2, etc. These factors are selected in such a way in conjunction with the divider module and output meter multiplier, that the output reads directly in units of heat transfer coefficient. It should be noted that the grant constant K used in the calculation of the heat transfer coefficient value is constant only when the water flow is constant. If the water flow is variable, the factor K must also be variable. This is accomplished by selecting a different value for the output meter multiplier of the divider circuit. A selector switch may be included so that several precalibrated settings corresponding to different flow rates is chosen. This will become more apparent by reference to the circuits shown hereinafter.

Figure 7:
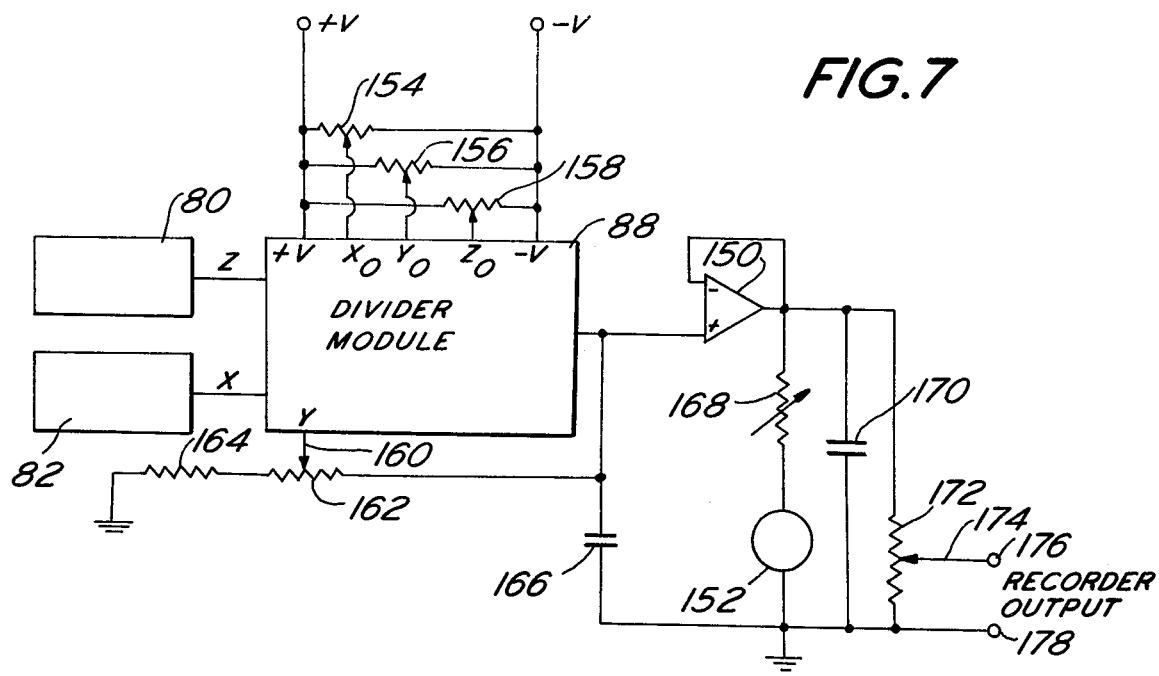
FIG. 7 is a schematic diagram of the electronic circuitry used in the heat transfer measuring device.

Referring now to FIG. 7 wherein the circuitry for determining the heat transfer coefficient is shown in greater detail. The circuit includes, in addition to the differential thermometers 80 and 82 and the divider module 88, operational amplifier 150, a voltmeter or gauge 152 and associated capacitors and variable resistors. The divider module has its +V input connected to +V and its −V input connected to −V. There are three variable resistors 154, 156 and 158 which are connected between the +V and −V and the wiper arms associated therewith are connected respectively to the $X_0$, $Y_0$, and $Z_0$, inputs of the divider module. Variable resistors 154, 156, and 158 serves only to calibrate the divider module 88. The Y input of the divider module is connected to the wiper arm 160 of a variable resistor 162. The variable resistor 162 is connected serially to a resistor 164 and then to ground. On the other end, the variable resistor 162 is connected via capacitor 166 to ground and to the noninverting (+) input of operational amplifier 150.

The output of divider module 88 is also connected to the noninverting input of the operational amplifier 150. The output of the operational amplifier 150 is connected to the inverting input of the operational amplifier thereby causing the operational amplifier 150 to act as a voltage follower.

The output of operational amplifier 150 is also connected to the input of the voltmeter 152 via resistor 168. Resistor 168 is variable and may be used as a voltmeter multiplier to determine the factor which is used to enable the analog voltmeter to read directly in heat transfer coefficient units. The output of amplifier 150 is also connected to ground via capacitor 170. Connected in parallel with capacitor 170 is a variable resistor 172. The resistor 172 has a wiper arm 174 to enable the voltage taken at the output of the amplifier 150 to be varied in accordance with the range desired so that output terminals 176 and 178 are utilized as a recorder output.

The divider module 88 is preferably a type AD 530 divider module. The output of the divider is equal to (10z/X) volts. The type AD 530 divider module requires that the X input voltage be a negative voltage and therefore the differential thermometer is so wired that transistor B is placed in the fluid of a higher temperature than is transistor A. In the instant device, transistor B of differential thermometer 82 is the transistor 46 in probe 40 and transistor A corresponds to transistor 56 in probe 36. The differential thermometer 82 thus provides a signal representing −(T3 − T1). As set forth above, the output signal of differential thermometer 80 provided a signal representing K1 (T2 − T1).

The divider output voltage is thus equal to $$\frac{-10K1\,(T2-T1)}{K2\,(T3-T1)}$$

this can be written as:

$$\frac{-K\,(T2-T1)}{(T3-T1)}$$

which is equal to $$\frac{-mC}{A} \cdot \frac{(T2-T1)}{(T3-T1)} = -U.$$

The variable resistor 168 is preset so that the value of K can be preset in accordance with the particular voltmeter being used so that it reads directly in units of heat transfer coefficient. Different resistances can be used in order to provide the multiplication factors required for different K values. As set forth above, a selector switch can be included which is connected to the wiper arm so that several precalibrated settings corresponding to different flow rates can be chosen.

Figure 8:
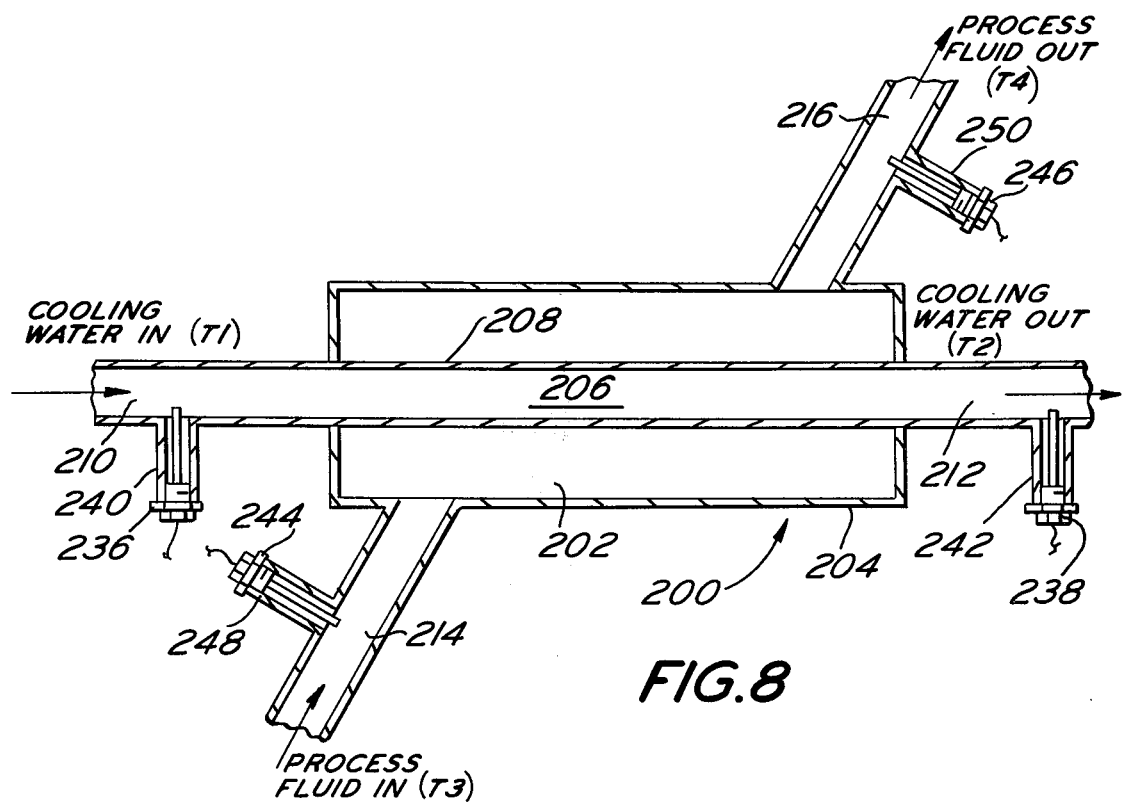
FIG. 8 is a schematic diagram of a heat exchanger of an alternate type in which a heat transfer measuring device embodying the invention is utilized.

FIG. 8 shows schematically a heat exchanger 200. Heat exchanger 200 is basically an industrial-type heat exchanger wherein industrial fluids are cooled by passing the industrial fluid adjacent a compartment in which cooling water is flowing.

The heat exchanger 200 comprises a first chamber 202 which is formed by housing 204. A second chamber 206 is formed by a heat exchange tube 208 which is preferably comprised of a heat conductive material such as aluminum or copper. The heat exchange tube 208 includes inlet port 210 and an outlet port 212. The chamber 202, which completely surrounds the cylindrical periphery of tube 208, includes an inlet port 214 and an outlet port 216. Process fluid is thus fed into chamber 202 via inlet port 214 and is taken out via outlet port 216. The cooling water is provided into the inlet port 210 at a temperature T1 as indicated parenthetically in FIG. 8 and flows out of outlet port 212 at a temperature T2. The temperature at the cooling water input is sensed by a temperature sensor probe 236 which is similar in construction to probe 36 in that it includes a pair of temperature sensors.

A second probe 238, which is of similar construction to probe 36, is provided to sense the temperature of the cooling water as it comes out of the outlet port 212. The probes 236 and 238 are threadedly secured in flanges 240 and 242, respectively, with the sensors of the probes being directly in the path of the cooling water so that temperatures T1 and T2 can be determined thereby. A pair of single temperature sensing probes 244 and 246, which are like probe 38, are provided in the inlet and outlet port of the process fluid chamber 202. The probe 244 is mounted in flange 248 and the probe 246 is mounted in flange 250 so that the sensor portion of the probes are directly in the inlet and outlet streams, respectively.

The process fluid which passes through chamber 202 is thus cooled by the cooling water traveling through the chamber 206. The water withdraws heat from the process fluid which contacts the walls of tube 208. In order to best understand how the heat transfer measuring device functions to measure the heat transfer coefficient in the system of FIG. 8, the following heat balance equations should be understood:

EQUATION VII $$Q_{exch.} = mC(T2-T1) = UA\Delta T$$

Where:
Qexch. = the heat which is exchanged in BTU/hr
$m$ = water mass flow rate in lbs./hr
$c$ = heat capacity of water in BTU/lb–°F
T1, T2, T3 and T4 are the temperatures at the positions specified by the legends T1, T2, T3 and T4 in FIG. 8

U = heat transfer coefficient in BTU/hr-ft²–°F
A = area of heat exchange tube in ft²
$\Delta T$ = average temperature difference between the fluid in chamber 64 and the fluid in chamber 62
$\Delta T$ is also defined as:

EQUATION VIII $$\Delta T = \frac{(T3-T1) + (T4-T2)}{2}$$

By substituting Equation VIII into Equation VII and then solving for U it is found that:

EQUATION IX $$U = \frac{2mC}{A} \cdot \frac{(T2-T1)}{(T3-T1)+(T4-T2)}$$

When m, C and A are constant, the equation for the heat transfer coefficient can be written as:

EQUATION X $$U = \frac{K(T2-T1)}{(T3-T1)+(T4-T2)}$$

It can therefore be seen that the heat transfer coefficient for the system shown in FIG. 8 can be calculated by determining the temperature differences between T2 and T1, T3 and T1, and T4 and T1. Thus, precision differential thermometers can also be utilized to obtain the heat transfer coefficient for the system of FIG. 8.

The heat transfer measuring device which is utilized to measure heat transfer coefficients in the heat exchanger shown in FIG. 8 requires the circuitry shown schematically in FIG. 9. In addition to the probes 236, 238, 244 and 246, the circuit includes three differential thermometers 252, 254 and 256. The circuit also includes an adder 258 and a divider 260. The adder and divider are both analog circuits. The temperature sensing transistors in probe 236 are connected to the differential thermometer 252 and 254 via lines 262 and 264, respectively. The temperature sensing transistors in probe 238 are connected via lines 266 and 268 to differential thermometers 252 and 256, respectively. The temperature sensor in probe 244 is connected via lines 270 to the differential thermometer 254 and the temperature sensor in probe 246 is connected via lines 272 to the differential thermometer 256. The output line 274 of differential thermometer 256 is connected to the input of divider 260, the output line 276 of differential thermometer 254 is connected to one input of adder 258, the output line 278 of differential thermometer 256 is connected to the second input of adder 258. The output 280 of adder 258 is connected to the remaining input of divider 260. The output of divider 260 is fed via line 262 to a meter which is calibrated for reading directly in the heat transfer coefficient.

The differential thermometers 252, 254 and 256 are each similar to the differential thermometer shown in FIG. 6. The output signal of differential thermometer 252 represents K1 (T2 − T1) where K1 is a first constant. The signal on line 276 from differential thermometer 254 represents K2 (T3 − T1) where K2 is a second constant. The output signal on line 278 of differential thermometer 256 represents K2 (T4 − T2).

The output of the analog adder 258 on line 280 is a signal representative of K3 [(T3 − T1) + (T4 − T2)] where K3 is a third constant. The output signal of the electronic divider module 260 on line 282 thus represents $$K \frac{(T2 - T1)}{(T3 - T1) + (T4 - T2)}$$

where K is the grand constant.

Referring now to FIG. 10 wherein the electronic circuitry utilized in conjunction with divider module 260 which is used for determination of heat transfer coefficients, in the heat exchanger shown in FIG. 8. The differential thermometers 252, 254 and 256 the adder 258 and the divider 260 are utilized in combination with an operational amplifier 292 which acts as a voltage follower and a voltmeter 294 which is an analog output meter or gauge which is calibrated by variable resistor 296 to read in the coefficient of heat transfer directly. Voltmeter 294 is similar to the voltmeters 104 and 152, each of which is preferably a D'Arsonval meter.

The adder 258 basically comprises an operational amplifier 296, a pair of resistors 298 and 300 and a feedback resistor 302. The differential thermometers 256 and 254 are connected to the inverting (−) input of the amplifier 296 via resistors 298 and 300, respectively. The resistor 302 is connected between the output line 304 of operational amplifier 296 and the inverting input of the operational amplifier.

Output line 304 is connected the the X input of the divider module 260. The output of differential thermometer 252 is connected to the Z input of divider 260 via line 274. The X input of the divider 260 is connected via capacitor 306 to ground and to one side of resistor 308. Resistor 308 is serially connected to resistor 310 to the output line 312 of the divider.

The output line 312 of the divider is connected via capacitor 314 to ground and to the noninverting (+) input of the operational amplifier 292. The resistor 310 is a variable resistor with the Y input of the divider module 260 connected to wiper arm 316 thereof. The +V input of the divider module is connected to positive voltage (+V) and the −V input of the divider module is connected to the negative voltage (−V).

Three resistors 318, 320 and 322 are connected across the +V and −V input lines to the divider module. Wiper arms of each of the variable resistors 318, 320 and 322 are connected to the $X_0$, $Y_0$ and $Z_0$ inputs of the divider module. Variable resistors 318, 320 and 322 serve to calibrate the divider module.

A resistor 324 is connected between the output line of the operational amplifier 292 and ground in parallel with resistor 296 and the voltmeter 294. The variable resistor 324 includes a wiper arm 326 which, in combination with the line 328, is connected to ground and is provided to be utilized by a recorder. The variable resistor 324 enables a range adjustment.

The differential thermometers 252, 254 and 256 are each constructed like the differential thermometer shown in FIG. 6. The divider module 260 is similar to divider module 88 (FIG. 7) in that the divider is a type AD 530 divider module. Thus, the output voltage of the divider 260 equals (10Z/X). As set forth above, X must be negative. As also set forth above, the output voltage of differential thermometer 252 is equal to K1 (T2 − T1) wherein K1 is a first constant.

The output voltage of differential thermometer 254 is equal to K2 (T3 − T1) wherein K2 is a second constant. The output of differential thermometer 256 equals K2 (T4 − T2).

The output voltage on output line 304 of adder 258 is equal to $$-K2 \frac{[(T3 - T1) + (T4 - T2)]}{2}$$

The output voltage on line 304 is thus the X input of the divider module.

The output voltage on line 312 of the divider module 260 is thus equal to $$-20 \frac{K1}{K2} \frac{T2 - T1}{(T3 - T1) + (T4 - T2)}$$

The value −20 (K1/K2) is equal to a grand constant −K and thus the output voltage which is applied to the voltmeter 294 is equal to $$-K \frac{(T2 - T1)}{(T3 - T1) + (T4 - T2)}$$

This is, of course, the equation for the heat transfer coefficient and the meter 294 is thus calibrated to read directly in the units of heat transfer coefficients.

It should be understood that the heat transfer measuring device 20 shown in FIG. 1 is provided with an additional gauge to show the temperature differential between T4 and T2. In addition, the device 20 also includes a probe 246 which is of the type shown in FIG. 3.

Referring to FIG. 11, there is shown therein a schematic of a section of a heat transfer tube wall 400 which has on one side a hot process fluid 402 and on the other side thereof has a cooling water 404. The legend $x$ represents the thickness of the heat transfer tube 400.

The heat transfer theory to describe the system shown in FIG. 11 includes the following equations:

EQUATION XI $$1/U_t = 1/h_w + 1/h_p + x/k + 1/h_f$$

where:
- $U_t$ = heat transfer coefficient of the system at time $t$
- $h_w$ = heat transfer coefficient of water film which is a constant
- $h_p$ = heat transfer coefficient of process fluid film which is a constant for the particular process fluid
- $h_f$ = heat transfer coefficient of any film of fouled material For convenience, the following can be written:

EQUATION XII $1/h_f = f$, where $f$ is termed the fouling factor. Thus, Equation XI can be rewritten as:

EQUATION XIII $$1/U_t = 1/h_w + 1/h_p + x/k + f$$

If the heat exchange tube is clean and free of any fouled material at time $t_0$, $f$ must be zero and Equation XIII at $t_0$ can therefore be written:

EQUATION XIV $$1/U_o = 1/h_{w} + 1/h_v + x/k$$

where:

$U_o$ is the overall heat transfer coefficient at the time $t_O$

Because $h_w$, $h_t$, $x$ and $k$ are all constant, substitution of Equation XIV in Equation XIII provides the following Equation:

EQUATION XV $$1/U_t - 1/U_o = f$$

Because of the constant terms in Equation XIV it can be written that:

EQUATION XVI $$1/U_o = k$$

Therefore, Equation XV can be written as:

EQUATION XVII $$f = 1/U_t - k$$

Figure 12:
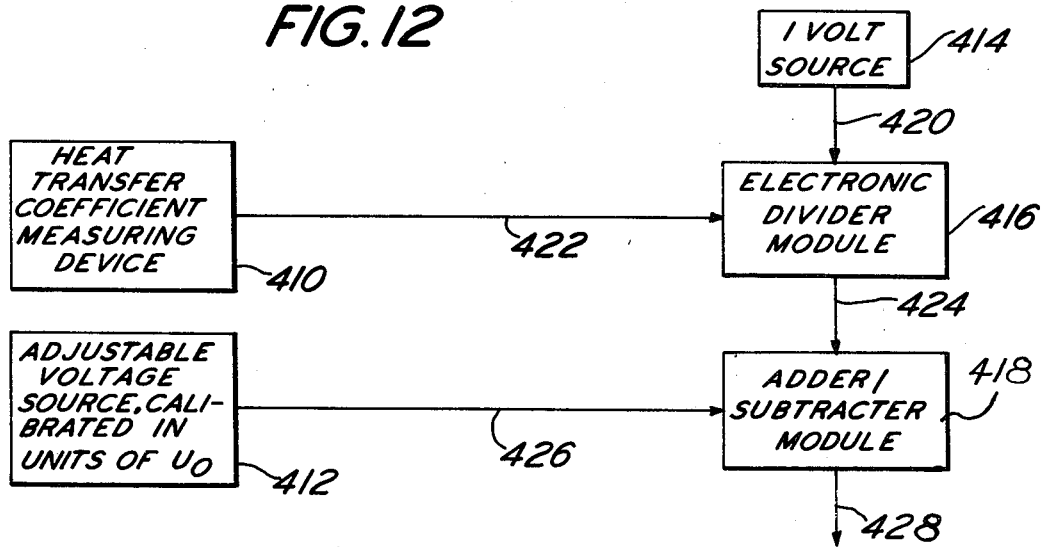
FIG. 12 is a schematic block diagram showing the electronic circuitry utilized for determining a fouling factor.
Figure 13:
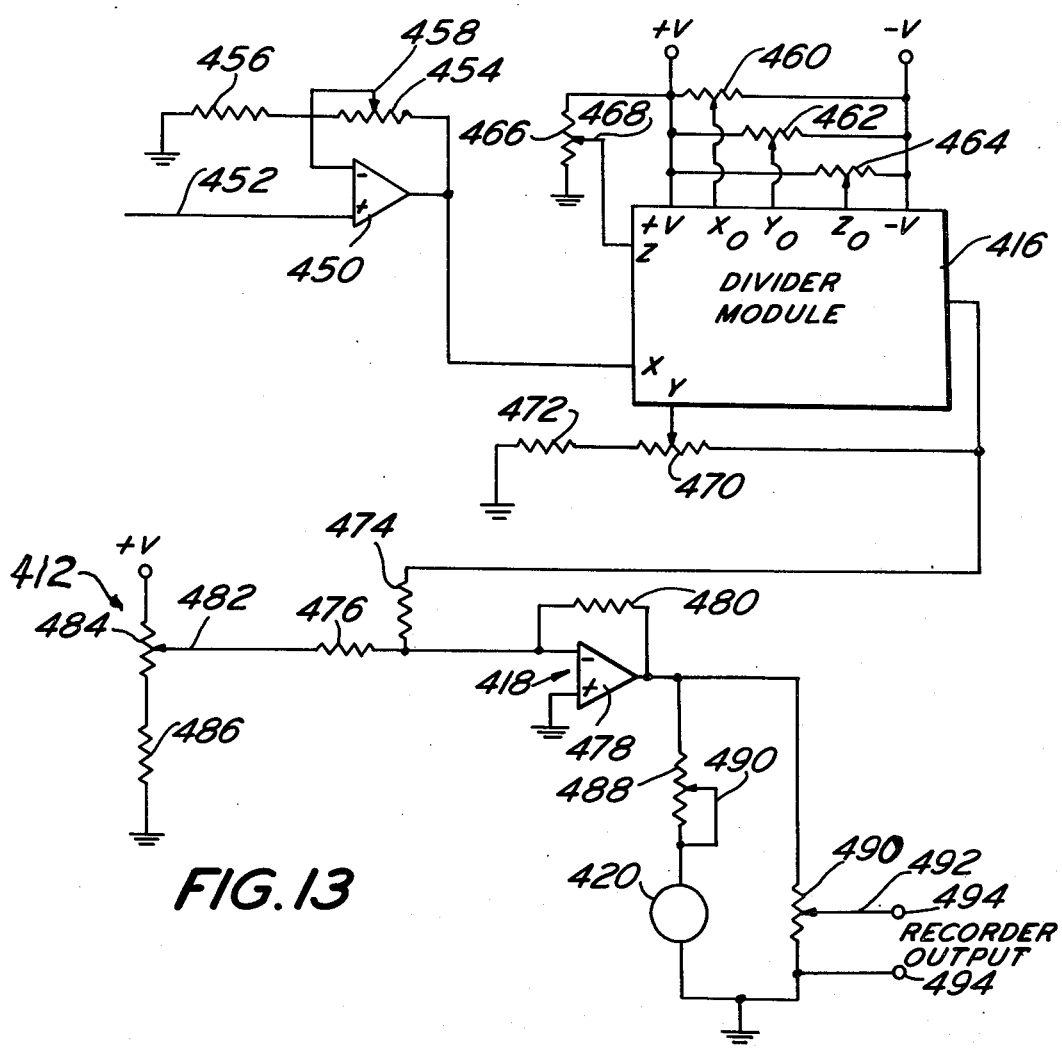
FIG. 13 is a schematic of the electronic circuitry utilized for determining the fouling factor.

Therefore, if $U_O$ or the heat transfer coefficient of the overall system at $T_O$ is known, the circuit shown in FIGS. 12 and 13 is used which provides the fouling factor automatically and continuously. It should be noted that the fouling factor is not a constant, but rather depends upon the fouling process. Fouling factors are small numbers, typically the number is less than one and in the range of 0.0005 to 0.1.

The block diagram of FIG. 12 shows how the fouling factor is automatically calculated. The circuitry includes a heat transfer coefficient measuring device 410, an adjustable voltage source 412 which is calibrated in units of $U_O$, a one volt source 414, an electronic divider module 416 and an adder/subtracter module 418. The one volt source 414 and the heat transfer coefficient measuring device 412 are connected to the inputs of the electronic divider module via lines 420 and 422, respectively. The output of the electronic divider module is connected via line 424 to the adder/subtracter module 418. The output of the adjustable voltage source 412 is connected via line 426 to the adder/subtracter module 418. The output of the adder/subtracter module is provided on line 428.

The heat transfer coefficient measuring device 410 is either the device shown in FIGS. 5 and 7 or FIGS. 9 and 10 which is dependent on which type of a heat exchanger is being used. For example, if the exchanger of FIG. 4 is being used, then the heat transfer coefficient measuring device 410 is the device shown in FIG. 5 and 7, whereas, if the heat exchanger in FIG. 8 is used, the heat transfer coefficient device shown in FIGS. 9 and 10 is used in block 410 in FIG. 12. The adjustable voltage source 412 is as set forth in block 412, calibrated in units of $U_O$. The adjustable voltage source is thus preset in accordance with the known value of $U_O$ to provide a constant signal on line 426 to the adder/subtractor module 418. Thus, the output of the adder/subtracter module provides an output signal on line 428 which is equal to $1/u_t - k$ where $k$ is the constant derived in Equation XVI above. The fouling factor is thus read out directly in volts from the adder/subtractor module 428.

The electronic schematic of the circuit is shown in FIG. 13. The circuitry shown in FIG. 13 includes an operational amplifier 450, divider module 416, adder/subtracter module 418 and voltmeter 420 and associated circuitry. The operational amplifier 450 has connected to its noninverting (+) input line 452 the output of the heat transfer coefficient measuring device. The output of the operational amplifier 450 in addition to being connected to the X input of the divider module 416, is also connected to ground via a variable resistor 454 and resistor 456 which are connected together in serial.

The wiper arm 458 of resistor 454 is connected to the inverting input (−) of the operational amplifier 450. The divider module has +V connected to the +V input of the divider module 416 and −V connected to the −V input thereof. Three variable resistors 460, 462 and 464 each have one end thereof connected to the −V input of the divider module. Each of the variable resistors 460, 462 and 464 are also connected at their other ends to the +V input to the divider module. Variable resistors 460, 462 and 464 act to calibrate the divider module 416. Connected between +V and ground is variable resistor 466 which is tapped at one volt via wiper arm 468 which is connected to the Z input of the divider module 416. Resistor 466 thus comprises the 1 volt source 414 of FIG. 12.

The output of the divider module is connected to a variable resistor 470 which is in turn connected to resistor 472 and then to ground. The wiper arm of resistor 470 is connected to the Y input of the divider module 416.

The output line of the divider module 416 is also connected to the resistor 474 of the adder/subtracter 418. The adder/subtracter 418 is comprised of, in addition to resistor 474, resistor 476, operational amplifier 478 and feedback resistor 480. Both of the resistors 474 and 476 are connected to the invering input of operational amplifier 478. The non-inverting input to the operational amplifier 478 is connected to ground.

The output of the operational amplifer 478 is connected to the inverting input thereof via the resistor 480. The other end of resistor 476 is connected to wiper arm 482 of variable resistor 484. The resistor 484 is connected serially to resistor 486 and the two resistors are connected between +V and ground. The adjustable voltage source 412 is thus comprised of resistors 484, 486 and the voltage source +V.

The output of operational amplifier 478 is also connected to a variable resistor 488 and a second variable resistor 490. Resistor 488 is connected at its other end to volt meter 420 which is in turn connected to ground at its other end. The other end of resistor 490 is also connected to ground. The wiper arm of resistor 488 is provided to enable the multiplication factor for the meter 420 to be varied so that the voltmeter reads the fouling factor directly in the units desired. The variable resistor 490 includes a wiper arm 492. The wiper arm 492 enables an adjustment of the maximum voltage applied across terminals 494 which are connectable to a recorder for recording the change in fouling factor.

In operation, line 452 to the operational amplifier 450 is connected to the output of the heat transfer coefficient meter of either of the circuits shown in FIG. 7 or FIG. 9, depending on the type of heat exchanger used. The operational amplifier 450 is connected as a follower with gain. The output of the operational amplifier is so set that the quantity $10 (1/U_O)$ does not excede +V, the power supply voltage. The heat transfer coefficient at a particular time of the heat exchanger system is thus fed to the X input of the divider module. The divider module provides at the output thereof a voltage which equals $(10Z/X)$. Since one volt is fed to the Z input of the divider 416, the output voltage equals $10/U_t$) volts. The voltage from the divider module 416 is thus fed via resistor 474 to operational amplifier 418. The variable resistor 484 of the potentiometer provides the voltage equivalent of $U_0$ to the operational amplifier 478 via resistor 476. In view of the fact that the output voltage of the divider module 416 is negative, there is a subtraction of the voltages provided to resistors 476 and 474. The output of the operational amplifier 478 is thus equal to $10 (-1/U_t + 1/U_0)$ which in turn equals $10 (1/U_t - 1/U_0)$ which is equal to $10f$. The meter multiplier comprises variable resistor 488 which is then adjusted so that the voltmeter 420 reads the fouling factor directly.

It can therefore be seen that a new and improved heat transfer measuring device has been provided. The measuring device can be used for directly measuring the heat transfer efficiency in a heat exchanger and provides readout in either terms of the heat transfer coefficient or the fouling factor.

In view of the fact that the calculation units are directly connected to the probes and are analog calculation devices, the changes of temperatures resulting in changes of heat transfer efficiency are constantly calculated and continuous readings in accordance with the temperatures at the various portions of the heat exchanger are provided. The readout of the heat transfer coefficient or the fouling factor enables continuous monitoring of the efficiency of the heat exchanger used in either an industrial or other type of heat exchange process.

The heat transfer measuring device also includes inexpensive components and provides accurate measurements with very small percentages or error in the readout of the heat transfer coefficient or fouling factor.

Without further elaboration, the foregoing will so fully illustrate our invention that others may, by applying current or future knowledge, readily adapt the same for use under various conditions of service.

What is claimed as the invention is:

1. A device for measuring the efficiency of a heat exchanger, said device comprising a plurality of temperature sensors, a plurality of difference means, each of said difference means responsive to a different pair of said sensors for providing a signal representative of the temperature difference between the locations of said sensors, calculation means responsive to said signals from said difference means for generating a signal representative of the efficiency of said heat exchanger, said exchanger having one fluid which is in a closed chamber and a second fluid which flows through a second chamber having an inlet and outlet port and which is separated by a heat conductive wall from said closed chamber, said plurality of temperature sensors being disposed at said inlet and outlet ports of said second chamber and within said closed chamber, a first of said difference means being responsive to said sensors at said inlet port and in said closed chamber, the second of said difference means being responsive to sensors at said outlet port and in said closed chamber.

2. The device of claim 1 wherein said calculation means comprises a divider and said divider receives said signals from said difference means, the output of said divider being a signal representative of the heat transfer coefficient of the heat exchanger.

3. The device of claim 2 wherein said calculation means further includes a second divider, said second divider receiving a first signal representative of a constant and the output signal of said first named divider, said calculation means further including an adder/subtracter which receives the output of said second divider and a second constant signal, the output of said adder/subtracter being a signal representative of the fouling factor of the heat exchange system.

4. The device of claim 3 wherein said second constant represents the heat transfer coefficient of said heat exchanger at an initial point in time.

5. A device for measuring the efficiency of a heat exchanger, said device comprising a plurality of temperature sensors, a plurality of difference means, each of said difference means responsive to a different pair of said sensors for providing a signal representative of the temperature difference between the locations of said sensors, calculation means responsive to said signals from said difference means for generating a signal representative of the efficiency of said heat exchanger, said heat exchanger having one fluid which flows through a first chamber and a second fluid which flows through a second chamber which is separated from said first chamber by a heat conductive wall, said first and second chambers each having an inlet and outlet port, said plurality of temperature sensors being disposed at each of said inlet ports and each of said outlet ports of said heat exchanger, a first of said difference means being responsive to said sensors at said outlet and inlet ports of said first chamber, a second of said difference means being responsive to said sensors in said inlet ports in said first and second chambers and a third of said difference means being responsive to said sensors in said outlet port of said first and second chambers, said calculation means including an adder which receives the output signals of said second and third difference means and a divider which receives the output of said adder and said first of said difference means, the output of said divider representing the heat transfer coefficient of the heat exchanger.

6. The device of claim 5 wherein said calculation means includes further means responsive to the said divider for providing a signal representative of the fouling factor of the heat exchanger.

7. The invention of claim 6 wherein the calculation means for determining the fouling factor includes a divider which receives a constant signal and a signal from the output of said first named divider and an adder/subtracter which receives the output of said second means divider and a constant signal for generating at the output thereof a signal representative of the fouling factor.

8. A device for measuring the efficiency of a heat exchanger, said device comprising a plurality of temperature sensors for sensing temperatures at a plurality of positions in said heat exchanger, a plurality of difference means, each of said difference means responsive to a different pair of said sensors for providing a signal representative of the temperature difference between the locations of said sensors, calculation means responsive to said signals from said difference means for generating a signal representative of the efficiency of said heat exchanger, said calculation means including an adder which receives the output signals of a first and second of said difference means and a divider which receives the output of said adder and the output of a third of said difference means, the output of said divider representing the heat transfer coefficient of said heat exchanger.

9. A device for measuring the efficiency of a heat exchanger, said heat exchanger including at least one chamber with an inlet and outlet port and a second chamber, said device comprising a plurality of temperature sensors located in said first and second chambers, a plurality of difference means, each of said difference means responsive to a different pair of said sensors for providing a signal representative of the temperature difference between the locations of said sensors, calculation means connected to said signals from said difference means for generating a signal representative of the efficiency of said heat exchanger by generating a ratio of the difference in temperature between said inlet and outlet ports of said first chamber to the sums of the differences of said temperatures at said inlet and outlet ports of said first chamber to temperatures in said second chamber.

10. The device of claim 9 wherein said second chamber is closed and said temperature difference between said inlet port of said first chamber and said second chamber and said temperature difference between said outlet port of said first chamber and said second chamber are substantially equal.

11. The device of claim 9 wherein said second chamber includes an inlet and outlet port and one of said sums of temperature differences is measured between said inlet ports of said first and second chamber and the other of said temperature differences is measured between said outlet ports of said first and second chambers.

* * * * *

UNITED STATES PATENT OFFICE
CERTIFICATE OF CORRECTION

Patent No. 3,918,300        Dated November 11, 1975

Inventor(s) Aaron Weisstuch et al.

It is certified that error appears in the above-identified patent and that said Letters Patent are hereby corrected as shown below:

On the Cover Sheet, the following should be added:

-- [73] Assignee: Betz Laboratories, Inc., Trevose, Pennsylvania --

Signed and Sealed this twenty-fifth Day of May 1976

[SEAL]

Attest:

RUTH C. MASON
*Attesting Officer*

C. MARSHALL DANN
*Commissioner of Patents and Trademarks*